Patented Aug. 16, 1932

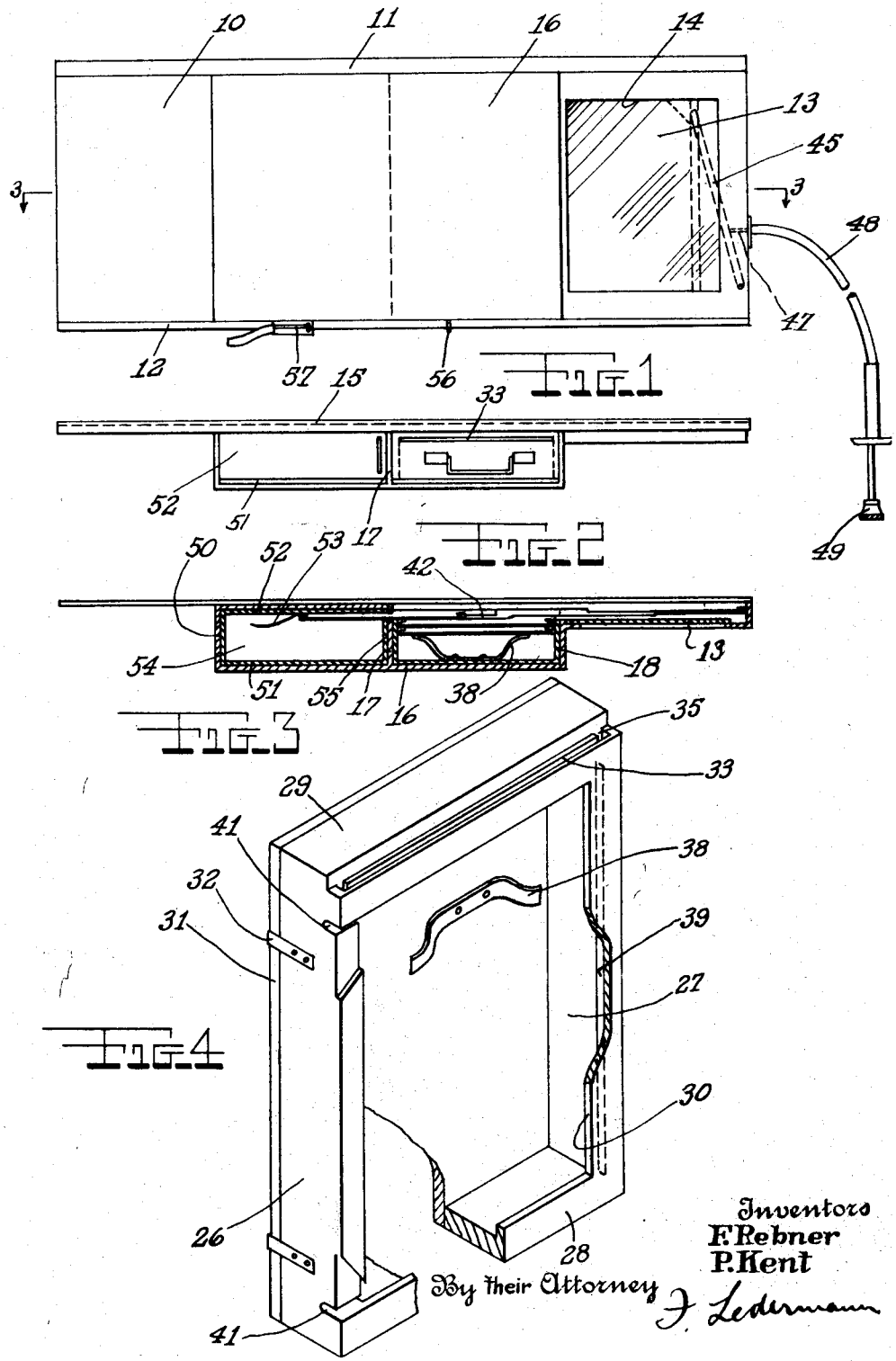

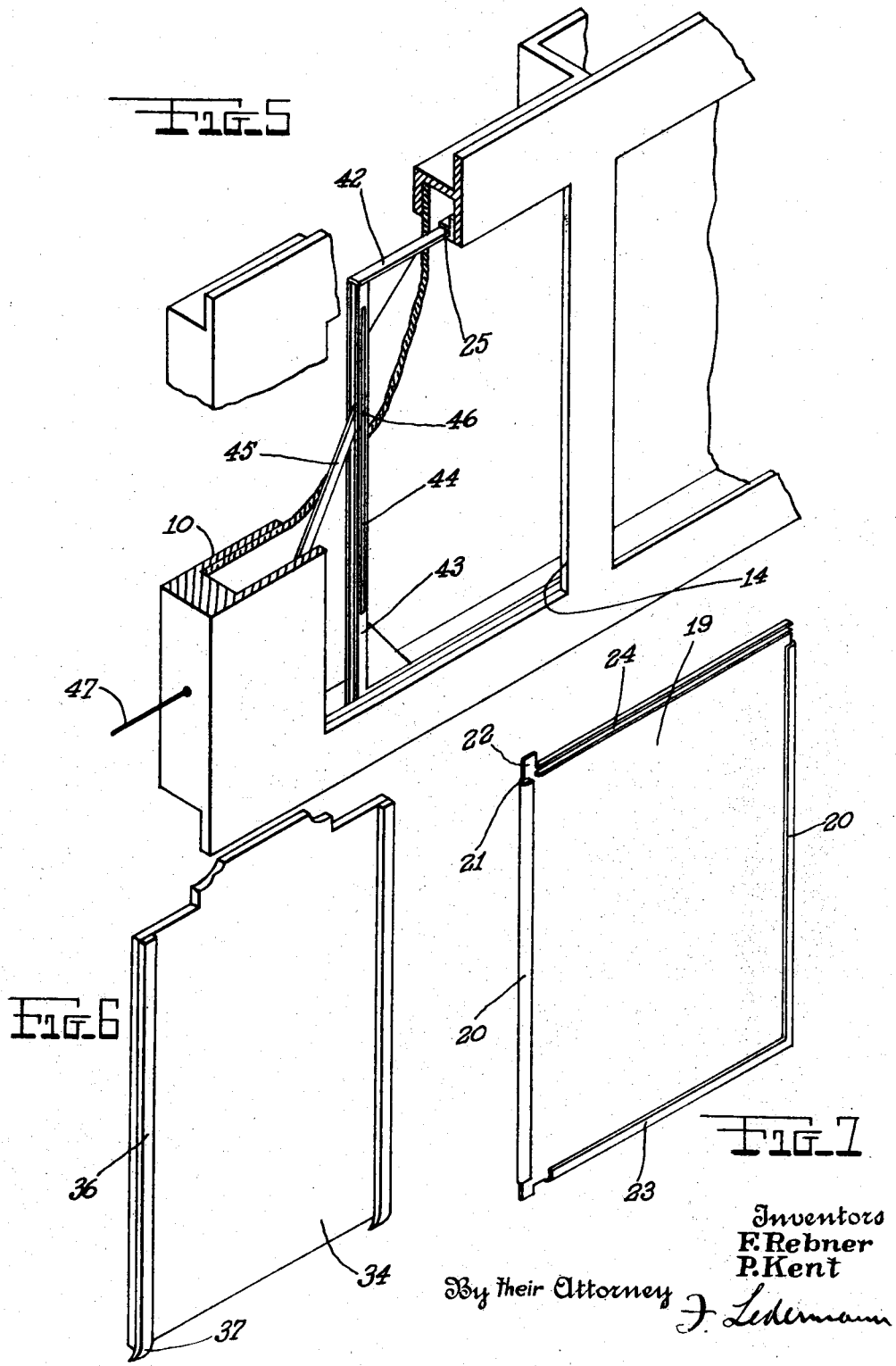

1,872,500

UNITED STATES PATENT OFFICE

FRANZ REBNER, OF NEW YORK, N. Y., AND PAUL KENT, OF HARTFORD, CONNECTICUT

STUDIO CAMERA FILM REPLACING DEVICE

Application filed July 11, 1930. Serial No. 467,181.

The main object of this invention is to provide a device for studio cameras in which a plurality of frames are secreted in a cartridge from which they are shifted one at a time after exposure has been made.

Another object of the invention is to provide a shifting apparatus for studio cameras which shunts photographic plate frames from a loaded cartridge to a receiver cartridge one at a time after exposure has been made.

The above and other objects will become apparent in the description below in which characters of reference refer to like-named parts in the drawings.

Referring briefly to the drawings, Figure 1 is a front elevational view of the rear wall of a studio camera showing the shifter means and the plunger operating the latter.

Figure 2 is a top plan view of Figure 1.

Figure 3 is a sectional plan view taken on line 3—3 of Figure 1.

Figure 4 is a perspective view of the photographic plate cartridge.

Figure 5 is a fragmentary perspective view of the section of the rear wall of the studio camera showing the photographic plate shifting means.

Figure 6 is a perspective view of the slide blind used for sealing the photographic plate cartridge.

Figure 7 is a perspective view of the photographic plate frame.

Referring in detail to the drawings, the numeral 10 indicates a panel which has its longitudinal side edges registering in guide rails 11 and 12 of the rear wall of a camera for studios. The panel is slidable adjacent the rear wall of the camera to permit the finder glass 13 which is mounted in one end of the panel and is visible through a substantially square aperture 14 to be shifted to a position where it is superimposed over an opening in the rear wall of the camera, the rear wall being indicated by the numeral 15. Intermediate the length of the panel 10 an elongated housing 16 is provided. This elongated housing is separated into two adjacently positioned compartments by a dividing wall 17. The compartment adjacent the finder glass 13 receives a box like cartridge 18 in which the frames holding the photographic plates are housed.

These frames in which the photographic plates are mounted comprise a back 19, rectangular in shape and of suitable size to permit the insertion of a standard or special photographic plate between the turned over ledges 20 of the frame. These ledges provide opposing channels 21 in which the longitudinal marginal edges of the photographic plate are inserted. The upper and lower corners at one side of the frame are provided with upstanding ears 22 which are engaged by the film shifter mechanism, which will be more fully hereinafter described. The lower marginal edge of the frame is also provided with a turned over ledge 23 and at the upper end of the frame a channel 24 is formed, by providing rails on the plate which channel receives the track 25 mounted in the panel of the device.

The housing 16 as previously stated is divided into two compartments both of which receive a magazine. The magazine loaded with the frames illustrated in Figure 7 is placed in the right hand compartment of the housing and is slid into place from the top. The normally loaded magazine comprises a box like structure having side walls 26 and 27 which are joined by a lower cross piece 28 and an upper cross piece 29. The front of the magazine has a flange 30 bounding a rectangular aperture through which the photographic plate mounted in the frame is visible. The magazine is equipped with a light door 31 on its opposite face, which is retained in sealed condition by tips 32, the latter being mounted on the side wall 26. The upper cross piece 29 is provided with a transverse slit 33 through which the blind 34 of the camera device is inserted over the photographic plates contained in the magazine. At the end of the slits 33 channels 35 are formed. These channels communicate with the slits at the ends of the latter and are receptive of wedge bars 36 which are mounted on one of the blinds. The lower ends of the wedge bars 36 on the blinds 34 project from the lower edge of the latter. These projecting ends 37 are curved to provide a cam surface for wedging frames 19 contained in the loaded magazine rearwardly into the latter, so that the magazine becomes light proof when the blind has been inserted into place. The closure door 31 has mounted upon its face a pair of spring members 38 which exert a pressure against the frames 19 urging the latter forwardly so that the foremost of these frames 19 will be aligned with an exit slot 39 formed in the side wall 27 of the magazine. Transverse passageways 40 and 41 are formed in the magazine wall 26 to permit the entrance of arms 42. These arms are arranged in pairs and extend longitudinally in a suitable track 25 and are joined by a connecting element 43, in which a slot 44 is formed longitudinally. The arms and connecting element are U-shaped and are moved transversely across the aperture 14 through the medium of a link 45. This link has a pin 46 secured thereto which registers in the slot 44. The opposite end of the link is pivotally secured at the lower corner of the panel member 10. A flexible mover wire 47 is connected to the link 45 and is cancelled in a hollow cable 48. This mover wire is provided with a knurled head 49 which is urged into the cable when it is desired to actuate the mechanism. The receiver magazine 50 is of substantially box-like structure with a rear hinged door 51 and a closed front wall 52. On the front wall of the receiver magazine, a pair of resilient fingers 53 are mounted one upon the other and the free ends of these fingers extend into the confines of the chamber 54 of the magazine. The side wall 55 of the receiver magazine is provided with a slot which is aligned with a slot in the dividing wall 17 of the housing. These slots in the side wall 55 of the receiver magazine and in the dividing wall 17 are of suitable length to receive the frames 19 and are aligned with the slot 39 in the loaded magazine when the latter is mounted in place in the housing.

The device is adapted to shift a used photographic plate away from the photographic field after a shutter has been operated and exposure made. Assuming that an exposure of the uppermost photographic plate mounted in the uppermost plate frame has taken place, the usual procedure has been to remove the plate from the camera. With the device illustrated in the accompanying drawings, however, the head 49 is urged into the hollow cable 48. This moves the wire 47 in the hollow cable toward the link 45, which latter has its free end rotatably lowered. As this link 45 swings through an arc, it shifts the U-shaped member comprising the arms 42 and the connecting element 43. The tips or ends of the arms 42 engage the upstanding ears 22 on the frame 19 and consequently shift this frame 19 with the photographic plate mounted thereon through the slot in the dividing wall of the housing and thence through the slot in the receiver magazine 50 and when completely received in this receiver magazine the resilient fingers 53 will shift said plate to the rear of the receiver magazine adjacent to the door 51. The entire panel is shifted after each exposure to permit the finder glass 13 to be moved directly behind the camera shutter for sighting the image. A pin 56 on the housing will then engage the plunger 57 of a plunger actuated shutter not shown on the drawings, thereby completing an exposure.

It is to be noted that certain changes in form and construction may be made without departing from the spirit and scope of the invention.

We claim:

1. In a camera, a movable panel adapted to be slidable on the rear wall of a camera, a housing having compartments therein, a loader magazine in one of said compartments, a receiver magazine in the other of said compartments, photograph frames normally located in said loader magazine, said loader magazine having a slit therein, a blind adapted to be inserted in said slit to seal said loader magazine against light, means on said blind for urging said frames in said loader magazine away from the open portion thereof and means movable on said panel for shifting said photograph frames from said loader magazine into said receiver magazine.

2. In a camera, a movable panel adapted to be slidable on the rear wall of a camera, a housing having compartments therein, a loader magazine in one of said compartments, a receiver magazine in the other of said compartments, photograph frames normally located in said loader magazine, said loader magazine having a slit therein, a blind adapted to be inserted in said slit to seal said loader magazine against light, means on said blind for urging said frames in said loader magazine away from the open portion thereof, a U-shaped member slidable on said panel and push button operated means for moving said U-shaped member to shift said photograph frame from the loader magazine into said receiver magazine.

3. In a camera, a movable panel adapted to be slidable on the rear wall of a camera, a housing having compartments therein, a loader magazine in one of said compartments, a receiver magazine in the other of said compartments, photograph frames normally located in said loader magazine, said loader magazine having a slit therein, a blind adapted to be inserted in said slit to seal said loader magazine against light, means on said blind for urging said frames in said loader magazine away from the open portion thereof, a U-shaped member slidable on said panel, means on said U-shaped member having parallel arms thereon, an element connecting said arms to said member, said connecting element having a slot therein, a link pivoted to said panel having one end engaged in said slot of said U-shaped member and push button operated means for engaging said photograph frames for shifting the latter from the loader magazine into the receiver magazine.

In testimony whereof we affix our signatures.

FRANZ REBNER.
PAUL KENT.